United States Patent Office 3,006,863
Patented Oct. 31, 1961

3,006,863
TITANIUM-LOADED MOLECULAR SIEVES
Charles R. Castor, Indianapolis, Ind., assignor to Union Carbide Corporation, a corporation of New York
No Drawing. Filed Sept. 24, 1958, Ser. No. 762,959
3 Claims. (Cl. 252—455)

This invention relates to zeolitic molecular sieves containing titanium metal or oxides thereof which are suitable for use as improved catalysts.

Titanium dioxide is known to be a satisfactory catalyst for the decomposition of ethyl acetate to acetic acid and ethylene.

In addition it is known to be a good oxidation catalyst and polymerization catalyst. For example, anthacene is readily oxidized in the vapor phase to anthraquinone by titanium oxides supported on pumice. When about 2 percent by volume of nitrogen oxides is added to a mixture of anthracene vapor containing a four-fold excess of air over that theoretically required, the oxidation occurs smoothly at temperatures of about 400° C. to 500° C. in the presence of titanium dioxide. It would be desirable to provide these materials in a form having a very high metal surface as an integral part of a specific support material.

Accordingly it is an object of this invention to provide a new composition of matter which is a superior catalyst.

It is another object of this invention to provide a new composition of matter which may be readily converted to a superior catalyst.

Other objects will be apparent from the subsequent disclosure and appended claims.

The composition of matter which satisfies the objects of the present invention comprises a zeolitic molecular sieve containing a substantial quantity of at least one material selected from the group consisting of titanium and oxides thereof. This composition of matter contains the titanium and/or the titanium oxide in a form having a high specific surface which is suitable for chemisorption and catalysis. The titanium metal-bearing zeolitic molecular sieve is readily converted to the titanium oxide molecular sieve by standard oxidation means.

Zeolitic molecular sieves, both natural and synthetic, are metal aluminosilicates. The crystalline structure of these materials is such that a relatively large absorption area is present inside each crystal. Access to this area may be had by way of openings or pores in the crystal. Molecules are selectively adsorbed by molecular sieves on the basis of their size and polarity among other things.

Zeolitic molecular sieves consist basically of three-dimensional frameworks of $SiO_4$ and $AlO_4$ tetrahedra. The tetrahedra are cross-linked by the sharing of oxygen atoms. The electrovalence of the tetrahedra containing aluminum is balanced by the inclusion in the crystal of a cation, for example, metal ions, ammonium ions, amine complexes, or hydrogen ions. The spaces between the tetrahedra may be occupied by water or other adsorbate molecules.

The zeolites may be activated by driving off substantially all of the water of hydration. The space remaining in the crystals after activation is available for adsorption of adsorbate molecules. Any of this space not occupied by elemental metal is available for adsorption of molecules having a size, shape, and energy which permits entry of the adsorbate molecules into the pores of the molecular sieves.

The zeolitic molecular sieves, to be useful in the present invention, must be capable of adsorbing benzene molecules under normal conditions of temperature and pressure. Included among these molecular sieves, and preferred for the purposes of the present invention, are the natural zeolite faujasite, and synthetic zeolites X, Y, and L. The natural materials are adequately described in the chemical art. The characteristics of the aforementioned synthetic materials, and the processes for making them, are provided below.

The general formula for zeolite X, expressed in terms of mol fractions of oxides, is as follows:

$$0.9 \pm 0.2 M_{\frac{2}{n}}O : Al_2O_3 : 2.5 \pm 0.5 SiO_2 : 0 \text{ to } 8 H_2O$$

In the formula "M" represents a cation, for example hydrogen or a metal, and "$n$" its valence. The zeolite is activated or made capable of adsorbing certain molecules by the removal of water from the crystal as by heating. Thus the actual number of mols of water present in the crystal will depend upon the degree of dehydration or activation of the crystal. Heating to temperatures of about 350° C. has been found sufficient to remove substantially all of the adsorbed water.

The cation represented by the formula above by the letter "M" can be changed by conventional ion-exchange techniques. The sodium form of the zeolite, designated sodium zeolite X, is the most convenient to manufacture. For this reason the other forms of zeolite X are usually obtained by the modification of sodium zeolite X.

The typical formula for sodium zeolite X is $$0.9 \text{ Na}_2O : Al_2O_3 : 2.5 \text{ SiO}_2 : 6.1 \text{ H}_2O$$

The major lines in the X-ray diffraction pattern of zeolite X are set forth in Table A below:

Table A

| $d$ Value of Reflection in A. | 100 I/I₀ |
|---|---|
| 14.42±0.2 | 100 |
| 8.82±0.1 | 18 |
| 4.41±0.05 | 9 |
| 3.80±0.05 | 21 |
| 3.33±0.05 | 18 |
| 2.88±0.05 | 19 |
| 2.79±0.05 | 8 |
| 2.66±0.05 | 8 |

In obtaining the X-ray diffraction powder patterns, standard techniques were employed. The radiation was the KoC doublet of copper, and a Geiger counter spectrometer with a strip chart pen recorder was used. The peak heights, I, and the positions as a function of $2\theta$, where $\theta$ is the Bragg angle, were read from the spectrometer charge. From these, the relative intensities, $$\frac{100\ I}{Io}$$

where $Io$ is the intensity of the strongest line or peak, and $d(obs)$ the interplanar spacing in A, corresponding to the recorded lines were calculated. The X-ray patterns indicate a cubic unit cell of dimensions between 24.5 A and 25.5 A.

To make sodium zeolite X, reactants are mixed in aqueous solution and held at about 100° C. until the crystals of zeolite are formed. Preferably the reactants should be such that in the solution the following ratios prevail:

$SiO_2/Al_2O_3$ ---------------------------- 3–5
$Na_2O/SiO_2$ ---------------------------- 1.2–1.5
$H_2O/Na_2O$ ---------------------------- 35–60

The chemical formula for zeolite Y expressed in terms of oxides mole ratios may be written as $$0.9 \pm 0.2 Na_2O : Al_2O_3 : WSiO_2 : XH_2O$$

wherein "W" is a value greater than 3 up to about 5 and "X" may be a value up to about 9.

Zeolite Y has a characteristic X-ray powder diffraction pattern which may be employed to identify zeolite Y. The X-ry powder diffraction data are shown in Table B. The values for the interplanar spacing, d, are expressed in angstrom units. The relative intensity of the lines of the X-ray powder diffraction data are expressed as VS, very strong; S, strong; M, medium; W, weak; and VW, very weak.

Table B

| hkl | $h^2+k^2+l^2$ | d in A. | Intensity |
|---|---|---|---|
| 111 | 3 | 14.3–14.4 | VS |
| 220 | 8 | 8.73–8.80 | M |
| 311 | 11 | 7.45–7.50 | M |
| 331 | 19 | 5.67–5.71 | S |
| 333, 511 | 27 | 4.75–5.08 | M |
| 440 | 32 | 4.37–4.79 | M |
| 620 | 40 | 3.90–4.46 | W |
| 533 | 43 | 3.77–3.93 | S |
| 444 | 48 | 3.57–3.79 | VW |
| 551, 711 | 51 | 3.46–3.48 | VW |
| 642 | 56 | 3.30–3.33 | S |
| 553, 731 | 59 | 3.22–3.24 | W |
| 733 | 67 | 3.02–3.04 | M |
| 660, 822 | 72 | 2.91–2.93 | M |
| 555, 751 | 75 | 2.85–2.87 | S |
| 840 | 80 | 2.76–2.78 | M |
| 753, 911 | 83 | 2.71–2.73 | W |
| 664 | 88 | 2.63–2.65 | M |
| 931 | 91 | 2.59–2.61 | M |
| 844 | 96 | 2.52–2.54 | VW |
| 862; 10, 2, 0 | 104 | 2.42–2.44 | VW |
| 666; 10, 2, 2 | 108 | 2.38–2.39 | M |
| 775; 11, 1, 1 | 123 | 2.22–2.24 | VW |
| 880 | 128 | 2.18–2.20 | W |
| 955; 971; 11, 3, 1 | 131 | 2.16–2.18 | VW |
| 973; 11, 3, 3 | 139 | 2.10–2.11 | W |
| 884; 12, 0, 0 | 144 | 2.06–2.07 | VW |
| 886; 10, 8, 0; 12, 4, 2 | 164 | 1.93–1.94 | VW |
| 10, 8, 2 | 168 | 1.91–1.92 | VW |
| 995; 13, 3, 3 | 187 | 1.81–1.82 | VW |
| 11, 7, 5; 13, 5, 1 | 195 | 1.77–1.78 | VW |
| 10, 8, 6; 10, 10, 0; 14, 2, 0 | 200 | 1.75–1.78 | W |
| 997; 11, 9, 3 | 211 | 1.70–1.71 | W |

When an aqueous colloidal silica sol employed as the major source of silica, zeolite Y may be prepared by preparing an aqueous sodium aluminosilicate mixture having a composition, expressed in terms of oxide-mole ratios, which falls within one of the following ranges:

| | | | |
|---|---|---|---|
| $Na_2O/SiO_2$ | 0.20 to 0.40 | 0.41 to 0.61 | 0.61 to 0.80 |
| $SiO_2/Al_2O_3$ | 10 to 40 | 10 to 30 | 7 to 30 |
| $H_2O/Na_2O$ | 25 to 60 | 20 to 60 | 20 to 60 | maintaining the mixture at a temperature of about 100° C. until crystals are formed, and separating the crystals from the mother liquor.

When sodium silicate is employed as the major source of silica, zeolite Y may be prepared by preparing an aqueous sodium aluminosilicate mixture having a composition, expressed in terms of oxide-mole ratios, falling within one of the following ranges:

| | Range 1 | Range 2 | Range 3 |
|---|---|---|---|
| $Na_2O/SiO_2$ | 0.6 to 1.0 | 1.5 to 1.7 | 1.9 to 2.1 |
| $SiO_2/Al_2O_3$ | 8 to 30 | 10 to 30 | about 10 |
| $H_2O/Na_2O$ | 12 to 90 | 20 to 90 | 40 to 90 | maintaining the mixture at a temperature of about 100° C. until crystals are formed, and separating the crystals from the mother liquor.

The composition of zeolite L, expressed in terms of mol ratios of oxides, may be represented as follows:

$$1.0\pm0.1 \frac{M_2}{n} O : Al_2O_3 : 6.4\pm0.5 \ SiO_2 : yH_2O$$

wherein "M" designates a metal, "n" represents the valence of "M"; and "y" may be any value from 0 to about 7.

The more significant $d(A)$ values, i.e., interplanar spacings, for the major lines in the X-ray diffraction pattern of zeolite L, are given below in Table C.

Table C 16.1±0.3
7.52±0.04
6.00±0.02
4.57±0.03
4.35±0.04
3.91±0.02
3.47±0.02
3.28±0.02
3.17±0.01
3.07±0.01
2.91±0.01
2.65±0.01
2.46±0.01
2.42±0.01
2.19±0.01

Although there are a number of cations that may be present in zeolite L, it is preferred to synthesize the potassium and potassium-sodium forms of the zeolite, i.e., the form in which the exchangeable cations present are substantially all potassium or potassium and sodium ions. The reactants accordingly employed are readily available and generally water soluble. The exchangeable cations present in the zeolite may then conveniently be replaced by other exchangeable cations.

The potassium or potassium-sodium forms of zeolite L may be prepared by preparing an aqueous metal aluminosilicate mixture having a composition, expressed in terms of mole ratios of oxides falling within the following range:

$K_2O/(K_2O+Na_2O)$ _____ From about 0.33 to about 1.
$(K_2O+Na_2O)/SiO_2$ _____ From about 0.4 to about 0.5.
$SiO_2/Al_2O_3$ _____ From about 15 to about 28.
$H_2O/(K_2O+Na_2O)$ _____ From about 15 to about 41.

maintaining the mixture at a temperature of about 100° C. until crystallization occurs, and separating the crystals from the mother liquor.

The titanium-bearing molecular sieves may be prepared by intimately contacting an activated molecular sieve in an inert atmosphere with a fluid decomposable compound of titanium whereby the decomposable compound is adsorbed by the zeolitic molecular sieve in the inner adsorption area of the zeolitic molecular sieve. The adsorbed decomposable compound is then reduced in situ to provide metals having a high specific surface of correspondingly high chemical and catalytic activity. Gaseous hydrogen and/or alkali metals have been found to be suitable for the decomposition of titanium tetrahalides contained in the inner adsorption area of the zeolitic molecular sieve.

The zeolitic molecular sieve may be activated by heating it in a flowing stream of inert dry gas or vacuum up to a temperature of about 350° C.

In an example of the invention fifty grams of activated sodium zeolite X were placed in a flask and heated to 125° C. in argon. Then 6 grams of lump sodium were added with stirring and after dispersion in the zeolite, 12.4 grams of titanium tetrachloride were added slowly with continued stirring. After reaction was complete the material had a jet black color which turned light gray when exposed to air. It contained 6.2 percent titanium.

In the utilization of these metals for catalytic purposes they have also been supported by alumina, silica, mixtures thereof and aluminosilicates; when contained in the inner adsorption area of molecular sieves the metals provide superior catalysts because the metal is contained in the finest possible distribution in a highly active form. Molecular sieves have a higher surface area than any of the other catalyst supports. The uniform structure of the molecular sieves provides uniform activity throughout the catalytic surface. Further certain properties characteristic of zeolitic molecular sieves still further enhance the use of the metal-loaded products. For example, by properly selecting the pore size and the crystal structure by proper selection of molecular sieves it is possible to obtain the most favorable conditions for a given reaction even to the point of carrying on reactions in the presence of other materials which would normally interfere with the reaction. The selectivity of the various molecular sieves will in any case exclude the interfering catalysts from the catalytic surface while in no way preventing the desired materials from contacting the surface. Further the chemical and catalytic nature of the molecular sieve itself may be altered to suit the requirements of the reactants by the selection of the most suitable cation present in the molecular sieve structure.

If the titanium dioxide containing molecular sieve is desired it is a simple matter to oxidize the contained titanium to the oxide by standard oxidation means. It is desirable to maintain the temperature of this oxidation below the temperature at which the crystal structure of the zeolitic molecular sieve will be destroyed if all the advantages described for the metal-loaded molecular sieves are to be obtained with the titanium dioxide-loaded molecular sieves.

As used herein the term "activation" is employed to designate the removal of water from the zeolitic molecular sieves, i.e., dehydration, and does not refer to catalytic activity. The zeolitic molecular sieves containing the elemental metal and/or metal oxides exhibit catalytic activity.

The product of the present invention has a surface area about four times that expected with most alumina, silica or aluminosilicate supported metals thereby providing a greater surface area available for reaction. Since the external surface of the molecular sieve represents less than 1 percent of the total surface area it may be seen that there is an extremely large area available for chemisorption and catalysis in the internal portion of the molecular sieve. Since this region is available only through pores of molecular size it may be seen that selective chemisorption and catalysis may be obtained in a system containing a mixture of molecules some of which are too large to enter the pores whereas others are capable of entering the pores.

Zeolite X is described and claimed in U.S. Patent No. 2,882,244, issued April 14, 1959, to R. M. Milton.

Zeolite Y is described and claimed in U.S. patent application Serial No. 728,057, filed April 14, 1958.

Zeolite L is described and claimed in U.S. patent application Serial No. 711,565, filed January 28, 1958.

The preferred compositions of matter for the present invention which have been found to be most satisfactory and useful for catalytic purposes are the metal-loaded zeolites X, Y, and faujasite.

What is claimed is:

1. As a new composition of matter a dehydrated rigid three-dimensional crystalline metal aluminosilicate zeolite of the molecular sieve type capable of adsorbing benzene internally, such zeolite containing at least one material selected from the group consisting of elemental titanium and oxides thereof in the inner adsorption region of said crystalline metal aluminosilicate zeolite.

2. As a new composition of matter a dehydrated rigid three-dimensional crystalline metal aluminosilicate zeolite of the molecular sieve type chosen from the group consisting of zeolite X, zeolite Y, zeolite L, and faujasite containing at least one material selected from the group consisting of elemental titanium and oxides thereof in the inner adsorption region of said crystalline metal aluminosilicate zeolite.

3. As a new composition of matter dehydrated zeolite X containing elemental titanium in the inner adsorption region.

References Cited in the file of this patent

UNITED STATES PATENTS

| | | |
|---|---|---|
| 1,840,450 | Jaeger et al. | Jan. 12, 1932 |
| 2,306,610 | Barrer | Dec. 29, 1942 |
| 2,413,134 | Barrer | Dec. 24, 1946 |
| 2,617,712 | Bond | Nov. 11, 1952 |
| 2,882,243 | Milton | Apr. 14, 1959 |
| 2,882,244 | Milton | Apr. 14, 1959 |